G. B. BOOMER.
PRESS.

No. 170,467. Patented Nov. 30, 1875.

2 Sheets—Sheet 1.

Witnesses.
E. B. Scott
Louis Spahn

Inventor.
Geo. B. Boomer
pr R. F. Osgood,
Atty.

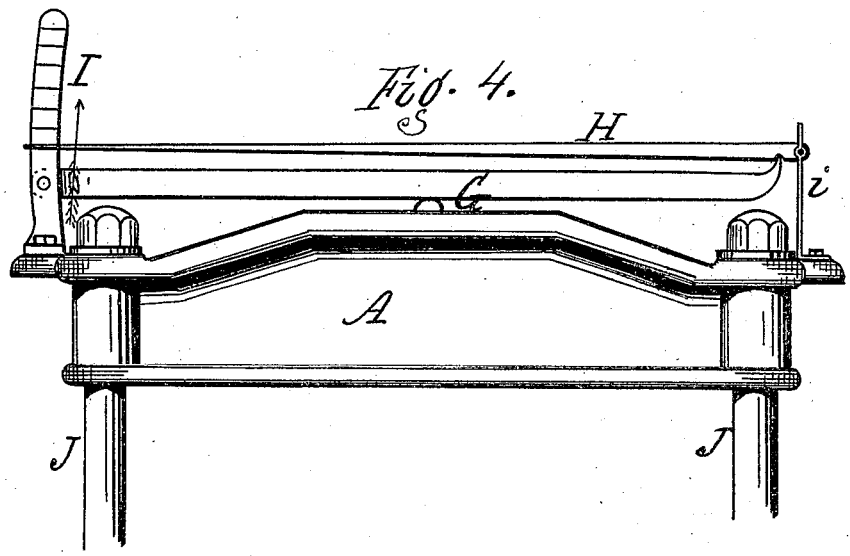
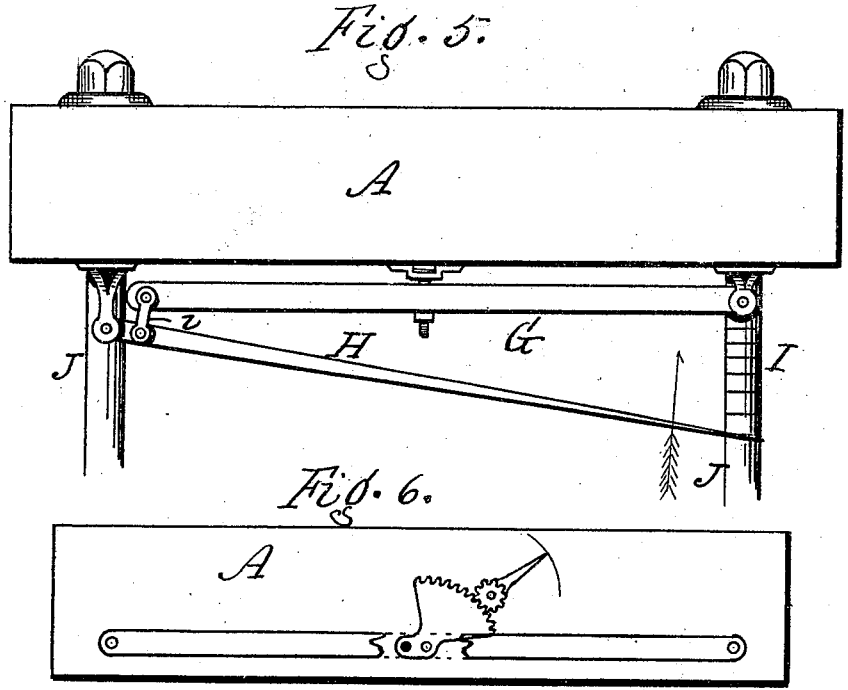
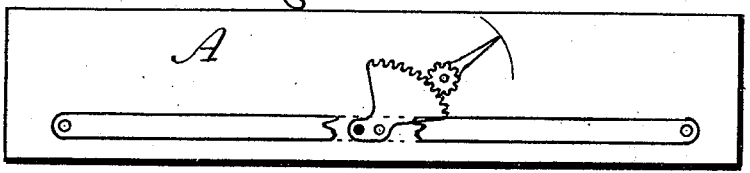

UNITED STATES PATENT OFFICE.

GEORGE B. BOOMER, OF SYRACUSE, NEW YORK.

IMPROVEMENT IN PRESSES.

Specification forming part of Letters Patent No. 170,467, dated November 30, 1875; application filed August 30, 1875.

CASE A.

*To all whom it may concern:*

Be it known that I, GEORGE B. BOOMER, of the city of Syracuse, in the county of Onondaga and State of New York, have invented a certain new and useful Improvement in Presses; and I do hereby declare that the following is a full, clear, and exact description of the construction and operation of the same, reference being had to the accompanying drawings, in which—

Figure 1:
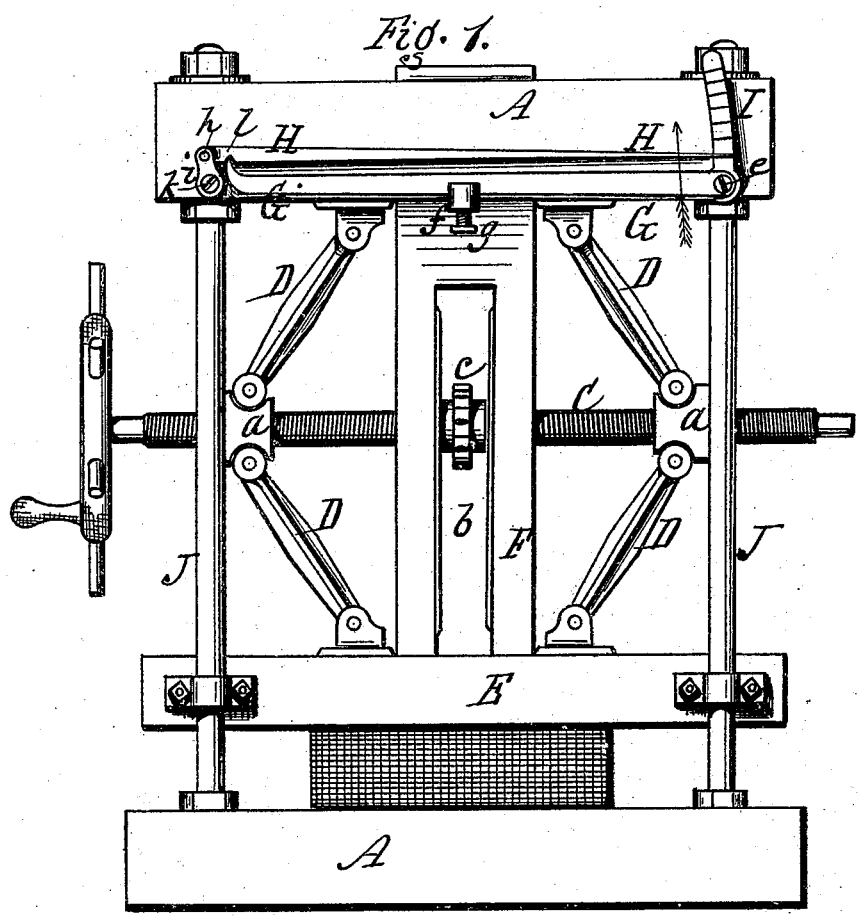
Figure 2:
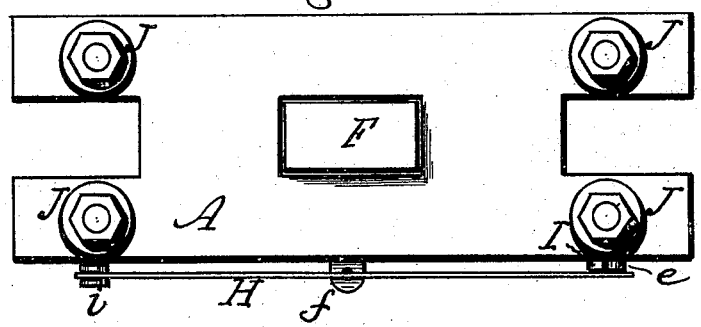
Figure 3:
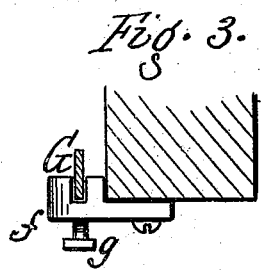

Figure 1 is an elevation of a toggle-press, showing my improvement. Fig. 2 is a plan. Fig. 3 is a detail view. Figs. 4, 5, and 6 are modifications.

My improvement relates to an apparatus for indicating the power produced by the press.

The invention consists in combining, with the head-block or foot-block of a press, a lever, or system of levers, as hereinafter described, whereby the indication will be made by the spring of said head or foot block under the strain, as will be more fully set forth.

The press may be of any of the known kinds having head and foot blocks A A. The drawings show a toggle-lever press, having a right-and-left screw, C, toggle-levers D D D D, and follower E, with standard F, which passes up through a socket of the head-block. The screw runs through nuts *a a a a*, and the follower runs upon rods J J J J. The standard F is provided with an opening, *b*, in which rests a hub, *c*, made fast to the screw, to prevent end motion of the screw, and consequent distortion of the levers under strain.

My improvement is as follows: G is a lever, pivoted at *e* to the head-block, and resting intermediately upon or within a bearing, *f*, attached to said head-block. A screw, *g*, or other adjusting device, is connected with the bearing *f*, and rests under the lever, so that the latter may be adjusted up or down by the screw *g*, which is necessary to bring the pointer to the zero-point whenever the head-block becomes permanently sprung or bent from long use under strain. H is a lever or pointer, which is pivoted at *h* to a rocker, *i*, that turns freely on the center *k*. The lower side of the pointer, near the fulcrum, has a notch, *l*, in which fits the upturned and pointed end of the lever G, as clearly shown in Fig. 1. The outer or free end of the pointer rests over a scale, I, which is graduated or marked with a scale of figures that represent the power of the press under different degrees of strain.

The action is as follows: When power is applied to the press the strain will spring the head-block at the center, and will therefore raise the lever G by means of the bearing *f* resting under it. The lever, in turn, transfers motion to the lever or pointer H, and the point of the latter, traveling over the scale, will indicate the pressure applied to the follower. The object of the rocker *i* is to prevent frictional contact or rubbing between the end of the lever and the bottom of the pointer, and therefore allow the latter to move without impediment, and with but slight impulse from the springing of the head-block, as well as to preserve the relative lengths of the lever and pointer under leverage, and in rising to different heights, which is essential in accurate registering. This it does by swinging of the rocker as the pointer rises or falls. The pointer being set at the zero-mark before pressure is applied, the degree of power can be very accurately ascertained by the rise of the pointer on the scale, as I have found by actual experiment; and this is true whether the head-block is made of iron or wood. The ends of the head and foot blocks being connected by the rods J J, there is no appreciable spring at those points where the pivots of the lever-work are placed; hence the spring of the head-block will be expended at the center, and raise the lever-work through the medium of the center bearing *f*. If at any time the head-block becomes permanently sprung or bent under action, the pointer can be readjusted to the zero-mark by turning down the screw *g*, upon which it rests, as before described.

The advantage of this arrangement is, that it is simple, cheap, and efficient, and, being in portable form, is easily applied to old presses as well as new, being simply attached outside, and operated by the spring or yielding of the head-block itself.

I am aware that devices are known for indicating the power of presses, such as hydrostatic gages, &c., but differing from mine, and not being combined with the press in such a manner as to be operated by the spring of the head-block.

The object of indicating the power is to regulate the pressure to the desired degree in compressing various articles, where excess of pressure is a detriment, and also to limit the power to the strength of the press. In a toggle-press such as shown, excess of pressure is frequently obtained without knowledge of the amount, and it is desirable that some means of indicating the pressure should be employed for safety.

The lever G alone might be made effective without the use of the lever or pointer H, since its free end might be used as a pointer moving in connection with a scale; but the movement would be so small, especially in a narrow press, that it is desirable to multiply the leverage in order to get a greater motion of the pointer. On the other hand, the number of levers might be increased above two, in which case the range of motion of the pointer would be increased, but without changing the result.

Various modifications in the arrangement of the lever-work may be made—for instance, as in Fig. 4, in which the lever and pointer are located above the head-block, the pointer being pivoted to a spring-rocker; or as shown in Fig. 5, in which the lever-work is located below the head-block, and a pivoted link is used to connect the lever and pointer; or as in Fig. 6, in which a segment and pinion are used, the pinion having a pointer, and the segment having double pivots at the bottom, one being attached to the head-block, and the other to a bar fastened at both ends to the head-block. In either case the effect is the same.

This invention may be applied to the foot-block, if desired, instead of the head-block, and with the same result.

Having thus described my invention, I do not claim, broadly, a mechanism applied to a press to indicate the power; but

What I claim as new is—

1. The combination, with the head or foot block of a press, of a lever or levers operating in connection with a scale, whereby the spring of the head or foot block under strain, acting on said lever or levers, is made to indicate the power produced, as herein described.

2. The attachment consisting of the lever G, pointer H, and rocker $i$, combined with the head or foot block of a press, in the manner and for the purpose specified.

3. The combination, with the lever G and the head or foot block A, of the bearing $f$ and adjusting-screw $g$, for the purpose of adjusting the pointer to the zero-mark, as herein described.

In witness whereof I have hereunto signed my name in the presence of two subscribing witnesses.

GEO. B. BOOMER.

Witnesses:
 R. F. OSGOOD,
 E. B. SCOTT.